United States Patent [19]

Stieber et al.

[11] Patent Number: 4,488,234
[45] Date of Patent: Dec. 11, 1984

[54] METHOD OF SENSING THE CURVATURE OF A GUIDE LINE

[75] Inventors: Michael Stieber, Weston, Canada; Gunther Dreher, Munich, Fed. Rep. of Germany

[73] Assignee: MAN Maschinenfabrik Augsburg-Nurnberg AG, Munich, Fed. Rep. of Germany

[21] Appl. No.: 320,784

[22] Filed: Nov. 12, 1981

[30] Foreign Application Priority Data

Nov. 18, 1980 [DE] Fed. Rep. of Germany ....... 3043472

[51] Int. Cl.$^3$ ............................................. B60K 31/00
[52] U.S. Cl. .................................................... 364/424
[58] Field of Search ... 364/200 MS File, 900 MS File, 364/449, 436, 444, 443

[56] References Cited

U.S. PATENT DOCUMENTS

| | | | |
|---|---|---|---|
| 3,534,399 | 10/1970 | Hirsch | 364/449 |
| 3,621,211 | 11/1971 | Perkins | 364/449 |
| 3,621,212 | 11/1971 | Hobbs | 364/449 |
| 3,845,289 | 10/1974 | French | 364/444 |
| 4,301,506 | 11/1981 | Turco | 364/444 |
| 4,361,202 | 11/1982 | Minovitch | 364/438 |
| 4,424,875 | 1/1984 | Yoshida | 364/424 |

Primary Examiner—Gareth D. Shaw
Assistant Examiner—John G. Mills
Attorney, Agent, or Firm—Alan H. Levine

[57] ABSTRACT

A method of sensing the curvature of a routing or guide line used in automatic steering of a vehicle. The actual position of the vehicle with respect to the guide line is determined, and an estimated position of the vehicle with respect to the guide line is determined by means of a vehicle model. The actual and estimated positions are compared to obtain the difference between them, the difference being an indication of the curvature of the guide line.

6 Claims, 3 Drawing Figures

METHOD OF SENSING THE CURVATURE OF A GUIDE LINE

This invention relates to a method for sensing the varying curvature of a routing or guide line used in automatic steering of vehicles.

In automatic steering of trackless vehicles along a guide line, as perhaps for public transport, safe and comfortable operation requires the sensing en route of curves or curvature variations in the guide line.

German Patent Specification DE-OS 25 51 571 cites a method of sensing the curves of a guide line such that the guide line is scanned at three points. This requires, however, three scanning elements and a corresponding number of facilities to process the test signals.

It is a broad object of the present invention to provide a method for sensing curves or curvature variations of the guide line with a moderate amount of instrumentation.

It is a particular object of the present invention to provide a method whereby the actual position of the vehicle relative to the guide line is compared with a position estimated by means of a vehicle model, and wherein the difference is indicative of the curvature of the guide line.

This provides an advantage over the known system in that it reduces the number of scanning elements or antennas, as well as the number of corresponding signal processing devices.

The method of the present invention provides a further advantage in that suitable tuning of the model will filter out guide line irregularities, field distortions, etc., which with the known method is not possible. With the known system, the three antennas scanning the guide line sense even the slightest disturbances in the course of the guide line as if they were curves and at certain conditions trigger rapidly successive, counterdirectional steering signals.

According to a feature of the present invention, the method is implemented with circuitry characterized by great simplicity from both the manufacturing and the control aspects.

The curvature determined in accordance with the present invention is fed back to the vehicle model to make it convergent to the actual curvature by virtue of a closed loop estimator. Correction is achieved by feeding back into the model the difference between the actual position of the vehicle and the estimated position.

According to a further feature of the present invention, unknown system quantities other than the guide line curvature can be sensed concurrently, such as the rate of deviation of the reference point from the guide line, as well as other, nonmeasurable quantities characterizing the state of motion. In this manner the steering control unit is provided with more positional information than would be possible using a single antenna.

The object of the present invention can alternatively be achieved if a steering quantity, such as the steering angle and its derivative, is used to generate, via threshold switches, signals that are processed to form a curvature signal.

In the process, the beginning and end of a curve or bend is indicated by suitable signals being triggered to motivate a steering control unit. This arrangement provides an advantage in that use can be made of steering control units having integrating components for accurate tracking in curves, with no deviations being caused by the charged integral at end of the curve.

Described below as an illustrative embodiment is an application of the present invention in automatically steering a trackless vehicle along a guide line. In the drawings.

Figure 1:
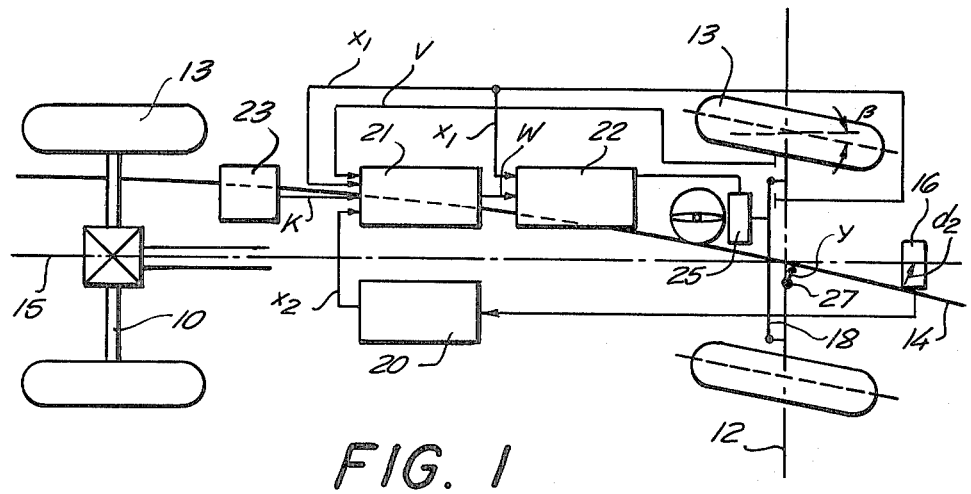
FIG. 1 is a schematic general arrangement of a trackless vehicle.

A vehicle having rear and front axles 10 and 12, respectively, plus associated wheels 13 is routed along the guide line 14, which here takes the shape of a guide or routing wire. The field of the guide wire is sensed by an antenna 16 arranged on the longitudinal centerline 15 of the vehicle.

The antenna signals are routed to a control unit comprising an electronic sensor circuit 20, a steering controller 21, an actuating controller 22, and a curvature sensor 23. The electronic sensor circuit 20 uses the antenna signals to determine the distance $d_2$ of the antenna 16 from the guide line 14. The distance signals $x_2$, together with a speed signal v, a curvature signal k from the curvature sensor, and a signal $x_1$ corresponding to a steering angle $\beta$ as measured inductively at the steering rod 18, are processed in the steering control 21 to form a steering signal w routed to the actuating controller 22. The actuating controller 22 motivates a hydraulic actuator 25, which moves the front wheels 13, and monitors their setting by means of the feedback of the actual steering angle $\beta$. In the process, the vehicle is being steered such that a reference point 27 selected on the front axle 12 maintains as short a distance y as possible from the guide line 14 throughout the travel. For the electronic sensor circuit 20, and the actuating controller 22, use can be made of conventional circuitry.

Figure 2:
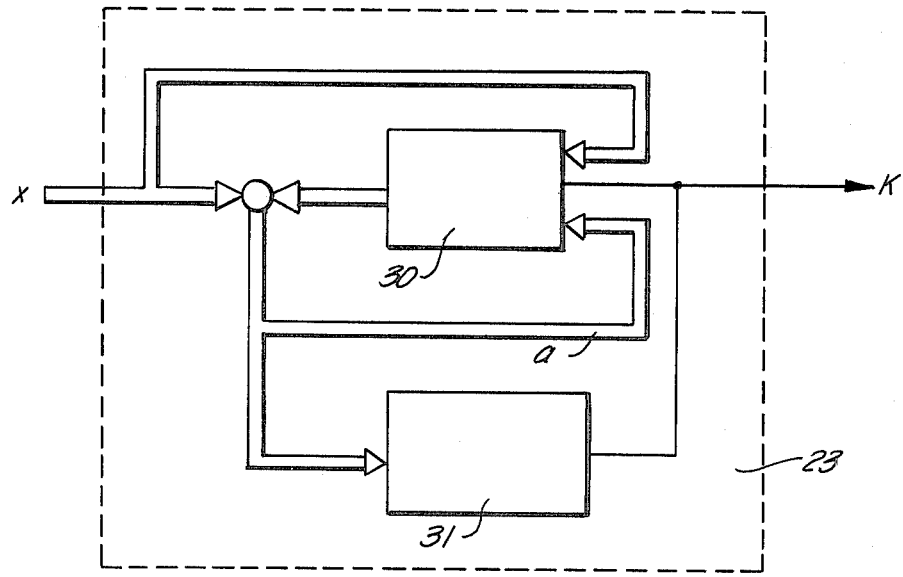
FIG. 2 is a block diagram of a curvature sensor.

For applications in which the steering controller 21 can quantitatively process curvature information, e.g., by means of computing reference signals, use can be made of a curvature sensor, 23 illustrated in FIG. 2 to sense the severity of the current curvature of the guide line 14.

The input quantities to the curvature sensor 23 are formed by a number of measured signals, part of which, such as the steering angle signal $X_1$ together with the most recently determined curvature signal k, operates a vehicle model 30, which can include an electronic computing circuitry of a type commonly associated with analogue computers. The vehicle model need not necessarily reflect the response of the vehicle in all detail; it will often be sufficient to model only certain aspects that are influenced by curvature, such as the angle included between the longitudinal centerline of the vehicle and the guide line. The output signals of the vehicle model describe the estimated position of the vehicle relative to the guide line, and they are compared with the measured signals characterizing the actual position.

The difference is used as input to a track model 31 which, in response to these deviations, estimates variations in curvature preferably such that the trend for the time immediately ahead is determined. The track model can be obtained using computing circuitry known from analogue computer applications. The design, for each specific application, considers the characteristic properties of the track model. Disturbances in the course of the guide line, such as field distortions or bulges caused by the manner in which the guide cable was imbedded are omitted in the track model. Curves or connecting stretches between curves can be modeled to form gentle transitions.

According to a further feature of the present invention, the vehicle model 30 responds to a deviation "a" between the estimated position and the actual position such that estimations can be corrected if they deviate slightly from the actual response of the vehicle.

Figure 3:
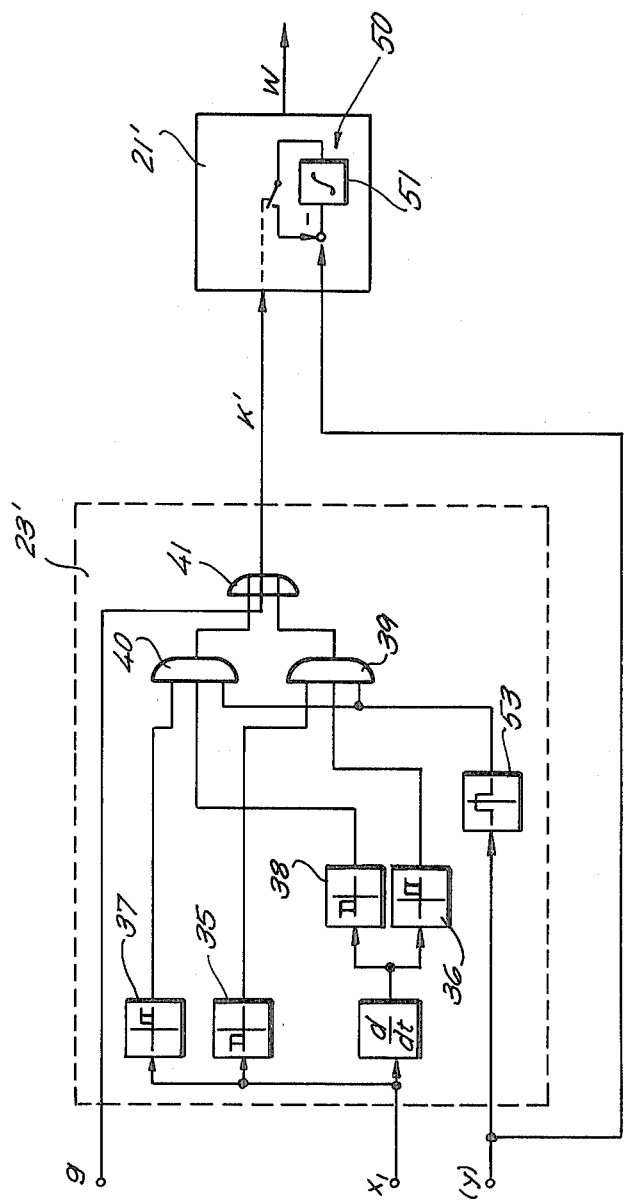
FIG. 3 is a schematic diagram of an alternative curvature sensor.

FIG. 3 illustrates another embodiment of the curvature sensor 23. In this version it is not the severity of curvature of the guide line 14 which is being sensed, but the end of the curve or bend. A binary curvature signal k' serves to activate a circuit 50 in the steering controller 21' so as to adapt the controller to the particular operating conditions in curves. For example, a controller 21', having an integral component 51, can give excellent accuracy of guidance at curves or bends. At the end of the curve, however, the integral component, having been charged in the curve, will over a certain period of time generally produce considerable deviations of the vehicle. The advantages of the integral component in the steering controller can be utilized by way of the curvature sensor 23' without penalties if in the last portion of the curve the integral component is turned into a lag component by means of a signal k' from the curvature sensor 23'. According to the signal processing 35–41 in FIG. 3, the final portion of a curve is reached when the steering mechanism is deflected to the left-hand side and moves to the right (signal from 36) or when the steering mechanism is deflected to the right-hand side (signal from 37) and moves to the left (signal from 38). In these cases the AND operation 39 and 40 of the OR operation 41 gives a signal to enable the curvature signal k'. If desired, additional conditions controlling the enabling or inhibition of the changeover can be provided.

For reasons of safety, the embodiment includes a threshold switch 53 to inhibit the changeover when the deviation $d_1$ of the vehicle from the guide line exceeds a certain value, as may be the case when speeding on curves. A change in mode is also required at a standstill to prevent the integral from drifting away. The standstill signal g immediately enters the OR operation 41. The threshold switches 35–38 preferably feature hysteresis to ensure clear transitions of the binary signals. Changes of the signal processing procedure 35–41 or suitable addition will make it possible to sense, instead of the end of a curve, the beginning and the end of the curve or bend.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:
1. A method of sensing the curvature of a guide line and automatically steering a vehicle thereby, comprising the steps of:
 (a) determining the actual position of the vehicle with respect to the guide line and producing a signal representative thereof;
 (b) estimating the position of the vehicle with respect to the guideline, by means of a simulated vehicle model using the steering angle and the guideline curvature, and producing a signal representative thereof;
 (c) comparing the actual and estimated position signals and producing a difference signal representative of the difference between the two position signals,
 (d) using the difference signal to estimate the curvature of the guideline, by means of a trackmodel mathematically representative of the general properties of the track, and producing a signal representative of the estimate curvature of the guideline.
 (e) using the estimated curvature signal to produce a steering signal, and
 (f) applying the steering signal to a control for steering the vehicle.

2. A method as defined in claim 1 wherein estimating the position of the vehicle with respect to the guide line is accomplished by using a computer-simulated vehicle model.

3. A method as defined in claim 2 wherein the difference signal is fed back to the vehicle model for correcting the estimated position signal produced by the model.

4. A method as defined in claim 1 wherein the estimated curvature signal is produced by applying the difference signal to a computer-simulated track model.

5. A method of sensing the curvature of a guide line and automatically steering a vehicle thereby, comprising the steps of:
 (a) producing a tracking error signal representative of the lateral distance between a point on the vehicle and the guide line,
 (b) generating a signal representative of the steering angle of the vehicle and its derivative,
 (c) using the steering angle signal to produce a curvature signal indicative of the initial and/or final portion of a curve,
 (d) using the tracking error signal and the curvature signal to produce a steering signal, and
 (e) applying the steering signal to a control for steering the vehicle.

6. A method as defined in claim 5 including the step of using the steering angle signal to produce binary signals, the latter being used to produce the curvature signal.

* * * * *